United States Patent [19]

Hoogeveen

[11] Patent Number: 5,442,683
[45] Date of Patent: Aug. 15, 1995

[54] DIRECTORY STRUCTURE FOR LARGE SCALE TELECOMMUNICATIONS NETWORK ALLOWING LOCATION OF ROAMING MOBILE SUBSCRIBERS

[75] Inventor: Jacobus Hoogeveen, Baarn, Netherlands

[73] Assignee: AT&T Corp., Murray Hill, N.J.

[21] Appl. No.: 268,415

[22] Filed: Jun. 30, 1994

Related U.S. Application Data

[63] Continuation of Ser. No. 7,751, Jan. 21, 1993, abandoned.

[51] Int. Cl.[6] .............................................. H04Q 7/36
[52] U.S. Cl. ...................................... 379/60; 379/59; 455/33.2
[58] Field of Search ................................ 379/58–60, 379/63, 219–221; 455/33.1, 33.2; 370/95.1

[56] References Cited

U.S. PATENT DOCUMENTS

| | | | |
|---|---|---|---|
| 4,748,655 | 5/1988 | Thrower et al. | 379/60 |
| 4,833,702 | 5/1989 | Shitara et al. | 379/60 |
| 4,868,558 | 9/1989 | Andros et al. | 379/59 |
| 4,868,562 | 9/1989 | Andros et al. | 379/63 |
| 4,901,340 | 2/1990 | Parker et al. | 379/60 |
| 5,036,531 | 7/1991 | Spear | 379/58 |
| 5,274,845 | 12/1993 | Wang . | |
| 5,295,154 | 3/1994 | Meir et al. | 370/95.1 |
| 5,333,188 | 7/1994 | Bogart et al. | 379/220 |
| 5,375,167 | 12/1994 | Bales et al. | 379/219 |
| 5,377,262 | 12/1994 | Bales et al. | 379/220 |

OTHER PUBLICATIONS

IEEE Telecommunications Conference Globecom 91, "Network Aspects for the Third Generation Mobiles Race Project", H. DeBoer, Dec. 2–5, 1991, pp. 1517–1522.
Proceedings of International Council for Computer Communication Intelligent Network Conference, "Distributed Database for Third Generation Mobile Systems", W. Van Den Broek, May4–6, 1992 pp. 333–347.
6th World Telecommunication Forum, "Next Generation in Mobile Communications", J. Grond, Oct. 10–15, 1991, vol. 2 pp. 369–373.
IEEE Network: The Magazine of Computer Communications, "Hierachical and Distributed Information Handling for UPT", Fujioka et al, vol. 4, No. 6, Nov. 1990, New York, pp. 50–60.
IEEE International Conference on Communications '92, "Performance Evaluation of a Hierachical Location Registration and Call Routing for Personal Communications", Wang et al, vol. 3, Jun. 1992, Chicago, pp. 1722–1726.
Vehicular Technology Society 42nd VTS Conference, "A Microcellular Interconnection Architecture for Personal Communications Networks", Malyan et al, vol. 1, May 1992, Orlando, pp. 502–505.

*Primary Examiner*—Curtis Kuntz
*Assistant Examiner*—Dwayne D. Bost
*Attorney, Agent, or Firm*—Alfred G. Steinmetz

[57] ABSTRACT

A mobile telecommunications system for a large area telecommunications system, including a plurality of different networks, has a directory/network structure for minimizing data storage and transmission and switching capacity requirements for locating roaming mobile terminals. A directory/network structure is provided with a plurality of directory/switching nodes arranged such that only one logical information and transmission path exists between any two nodes.

9 Claims, 12 Drawing Sheets

DIRECTORY STRUCTURE FOR LARGE SCALE TELECOMMUNICATIONS NETWORK ALLOWING LOCATION OF ROAMING MOBILE SUBSCRIBERS

This application is a continuation of application Ser. No. 08/007751, filed on Jan. 21, 1993, now abandoned.

FIELD OF THE INVENTION

This invention relates to communication networks for providing public telecommunications services within a large geographical service area (i.e. international). It is particularly concerned with a distributed communication system and a directory/network structure for enhancing the efficiency of subscriber location and call routing services.

BACKGROUND OF THE INVENTION

It is anticipated that 50% of the speech services provided by public telecommunications networks by the year 2000 will involve mobile subscriber terminals. To provide service to these mobile subscribers, it will be necessary to locate significant numbers of roaming subscriber terminals. Serving the roaming subscribers over a plurality of different networks within large geographical areas will under current subscriber directory schemes require huge data bases and transmission/switching capacity.

Existing public land mobile networks use a centralized home location register to store subscriber information. This register is interrogated to retrieve location information. It requires a large transmission and switching capacity and requires considerable time to locate information.

Directory systems with a hierarchal tree structure for application to large scale telecommunications networks have been proposed [RACE project 1043 (mobile)]. This directory arrangement guides a cell from a home node to a visited node. However, it requires that location information be stored in all the nodes in each level of the tree including the visited and home nodes.

SUMMARY OF THE INVENTION

A mobile telecommunications system for a large area telecommunications system, including a plurality of different networks, has a tree type directory/network structure for minimizing data storage and transmission and switching capacity requirements for locating roaming mobile terminals. A directory/network structure is provided with a plurality of directory/switching nodes arranged in a tree structure such that only one logical information and transmission path exists between any two nodes. (i.e., a subscribers home node and his visited node) Hence, subscriber information need only be stored at nodes in the shortest path between the visited node and the home node.

A subscribers' home node, in one illustrative embodiment, is identified by a key (i.e. his subscriber number) used to locate the subscriber or his data. This key is utilized to find location information for a particular subscriber who is roaming. This location information is stored at a subtree root node common to the home and visited location of the subscriber and in the shortest path between the home and visited location.

In a particular embodiment, each individual node has data processing and data storage capability and maintains a local directory. Each entry in this directory includes a subscriber number the home node identity and a visited node identity. Information on a subscriber is recorded in nodes in a path from the home node to the visited node. It also includes a routing table that identifies nodes in the subtree rooted in that individual node and a communication link to each node. Calls and messages are initially routed to a subscriber's home node and, if need be, from there to the first node identifying subscriber's visited node and from there they are rerouted to the visited node.

DETAILED DESCRIPTION

Figure 1:
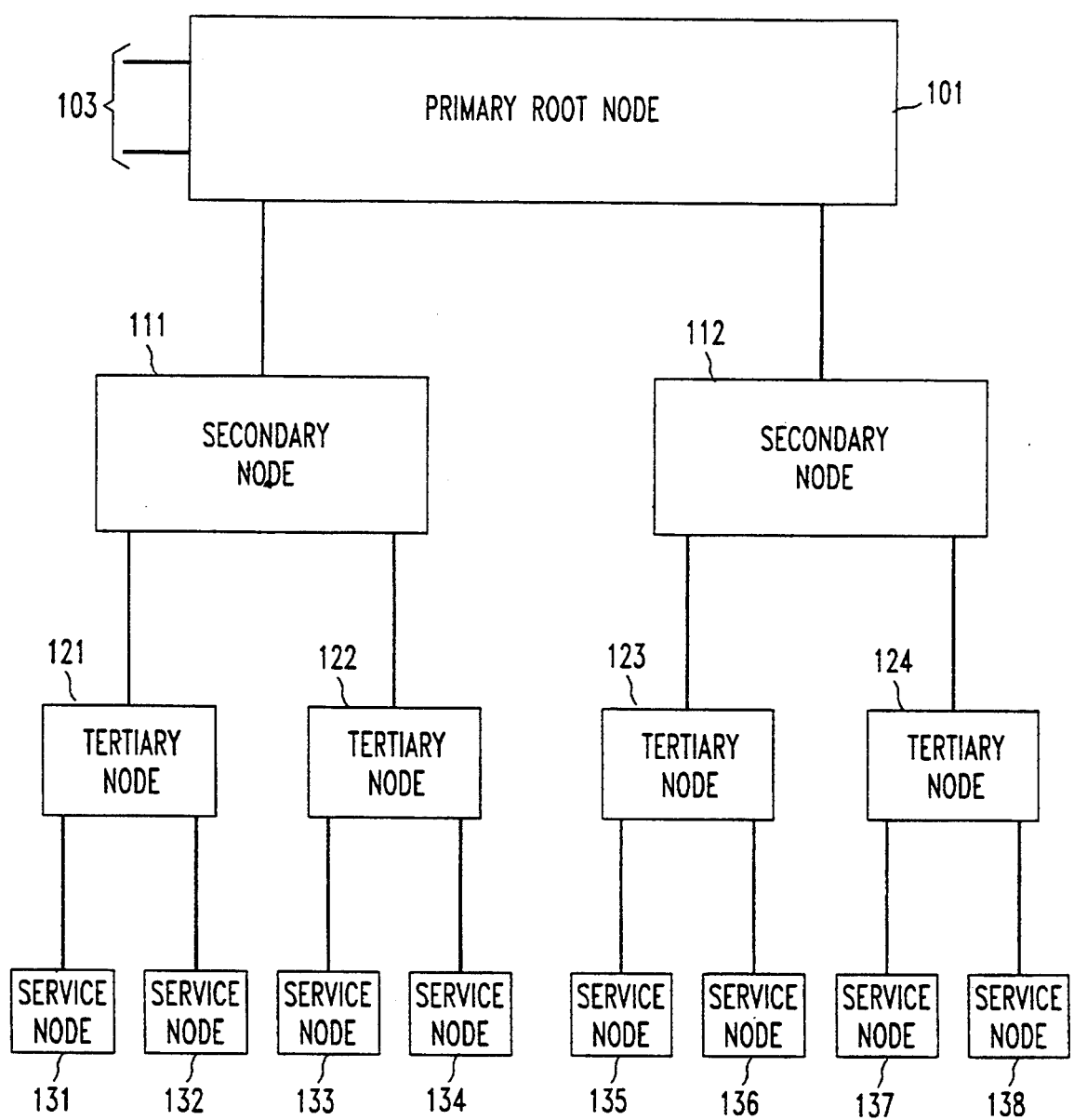
FIG. 1 is a block schematic of a directory/network structure embodying the principles of the invention.

A directory/network structure for a wireless telephone system embodying the invention is shown in the FIG. 1. The network structure is rooted in a root node 101 located at the highest level of the tree structure. The remaining nodes all descend in a bifurcating tree structure from this root node 101. Below the root node are two intermediary secondary tier nodes 111 and 112 each individually branching from the root node 101. Each of the secondary nodes 111 and 112 have the intermediary tertiary tier nodes 121,122 and 123, 124, descending therefrom, respectively. At the service connection level are the service provision nodes 131,132, 133, 134, 135, 136, 137 and 138. It is with these service provision nodes that an aerial or wireless service connection is made with the subscriber. Nodes 101, 111 and 112 may be considered transit nodes in the illustrative embodiment, while nodes 121,122, 123, 124, 131,132, 133, 134, 135, 136, 137 and 138 may be considered as local exchange nodes. As is readily apparent each node is only joined to one node at the next higher level of the tree. Each node contains data to identify all lower level nodes to which it is connected and for which it is a subtree root and the paths or routes that must be followed to reach the lower level nodes. A plurality of lines 103 may be provided at the root node 101 for facilitating connection to root nodes of other tree structured or other type data bases.

Figure 2:
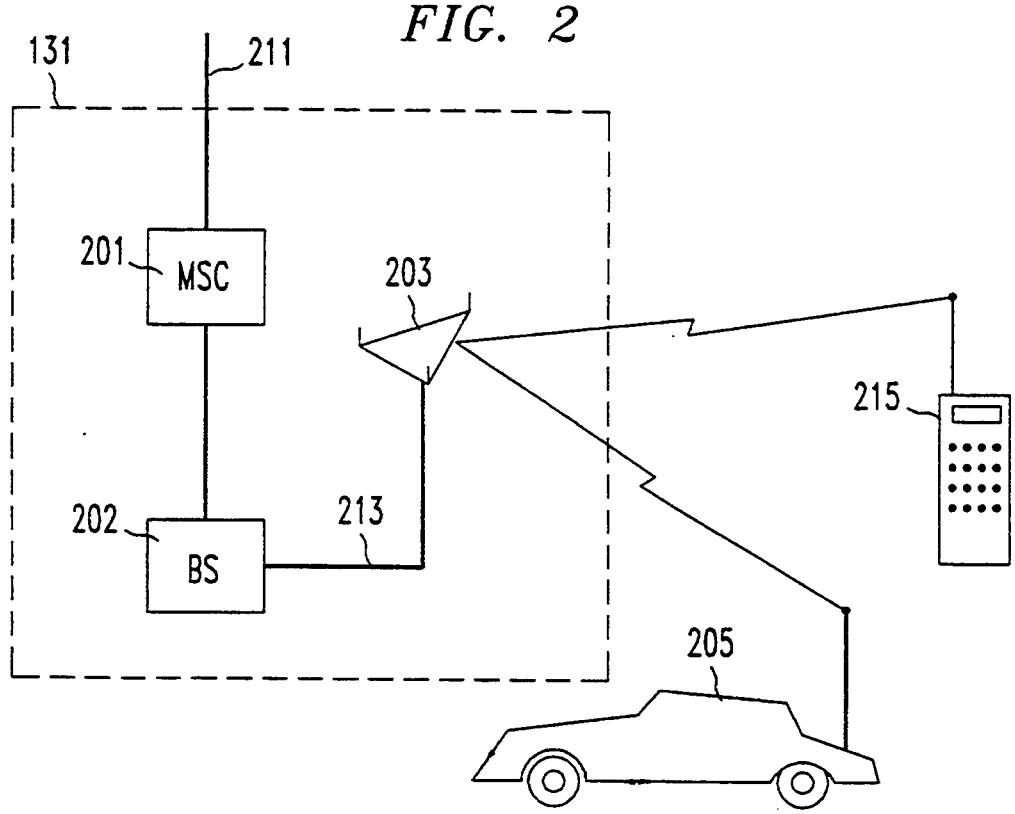
FIG. 2 is a block schematic of a subscriber service node of the directory/network structure which is one of the terminal nodes at the lowest level of the tree shown in the FIG. 1.

A typical subscriber service node shown in FIG. 2 includes a mobile switching center (MSC) 201 connected in the uplink direction to a telephone network and to the preceding upward directory and switching node in the tree structured network by trunk lines 211. In the down link direction it is connected, via line link 212, to a base station 202. While only the base station 202 is shown it is understood that the MSC 201 may be connected to a plurality of base stations each designated to cover a specific geographical area. Base station 202 includes radio transceiver equipment which is used to communicate, via an antenna 203, with mobile subscriber terminals such as the vehicular terminal 205 and the handheld terminal 215.

Each node (including root, intermediate and service nodes) in the tree includes a control processor and circuitry for data handling and storage of data. Stored data in any of the nodes may include subscriber data such as a subscriber home location, service profiles and a visited node location if the subscriber is roaming and away from the home location. Instructions are stored in each node to control call routing and the storage of and flow of information concerning subscriber data. The data processing equipment to be included in a node is exemplified by the data storage and processing equipment as shown in the FIG. 3. A plurality of processing circuits are connected to a bus 301. A processor 303 is controlled by stored program controls included in the ROM memory 304. Data related to subscribers, such as subscriber location and service profiles, is stored in the erasable data storage memory 302. A switching control 306 determines the destination of calls and information transmitted by the input-output interface 305. Interface 305, through input/output terminals 211 and 312, controls the direct input and output to and from other nodes.

Each subscriber has an assigned home location, which is one of the service nodes 131-138. The home location service node is the particular node that operates as an administrative base for the subscriber and includes information relating to the subscribers service profile and, via the tree directory, information as to a present or recently visited node location of the subscriber. The home location is preferably keyed or encoded into the subscribers number. Incoming calls to the subscriber are initially routed to the subscribers home service node.

In instances where the subscriber is roaming and connected to the telephone network through a visited service node, the directory/network structure is operative through the heirarchal structure of the directory tree to locate the subscriber with a minimum of search and data storage capacity required. In this tree directory/network structure the information related to a subscribers location is always located at a subtree root node in the tree structure which includes the shortest branch path of branches joining the home node, the visited node and the common intermediary subtree root node and is located between the visited and home node.

The location data of a subscriber includes his home locations and the visited locations currently or recently providing service to the subscriber. A subscriber may have different visited locations that provide different types of services such as voice and data services. Calls are initially addressed to a subscribers home location, if necessary, and routed to a visited location which represents an actual location of the subscriber or to a specific node providing a particular service to the subscriber.

Locating the visited service node utilized by a subscriber requires that the information identifying the currently visited node be accessed upon request. For example a subscriber may be assigned to the home service node 134 shown in FIG. 1. This subscriber may be utilizing the visited node 133. Location information for that subscriber is located in the nodes 133, 122 and 134. If the subscriber now moves to the node 132 the old location information must be deleted and new location information must be stored at the nodes 132, 121, 111,122 and 134. If the subscriber now moves to the visited service node 135, the location information is now stored at nodes 135, 123, 112, 101, 111,122, and 134.

If the subscriber initiates a call at a location not yet stored in a data storage identifying that initiation location, the directory system of the node receiving the call request, interrogates the data base of the node at the next higher tier level for information pertaining to the subscriber. Nodes rooted lower in the hierarchy by that next higher tier node are queried for information pertaining to the subscriber. The upward search continues until a node rooting a subtree including the subscribers currently visited node and the subscriber's home node is located. The call information is then routed through that rooting node which is rooting the subtree to the subscribers home service node or listed visited service node. For, example a subscriber who initiates a call at node 131 while being identified in the system as having a home location at node 134 and a visited location at node 133 causes a search to be initiated that is transmitted from node 131 to node 121 to node 111 to node 122 and to nodes 133 and 134.

Figure 4:
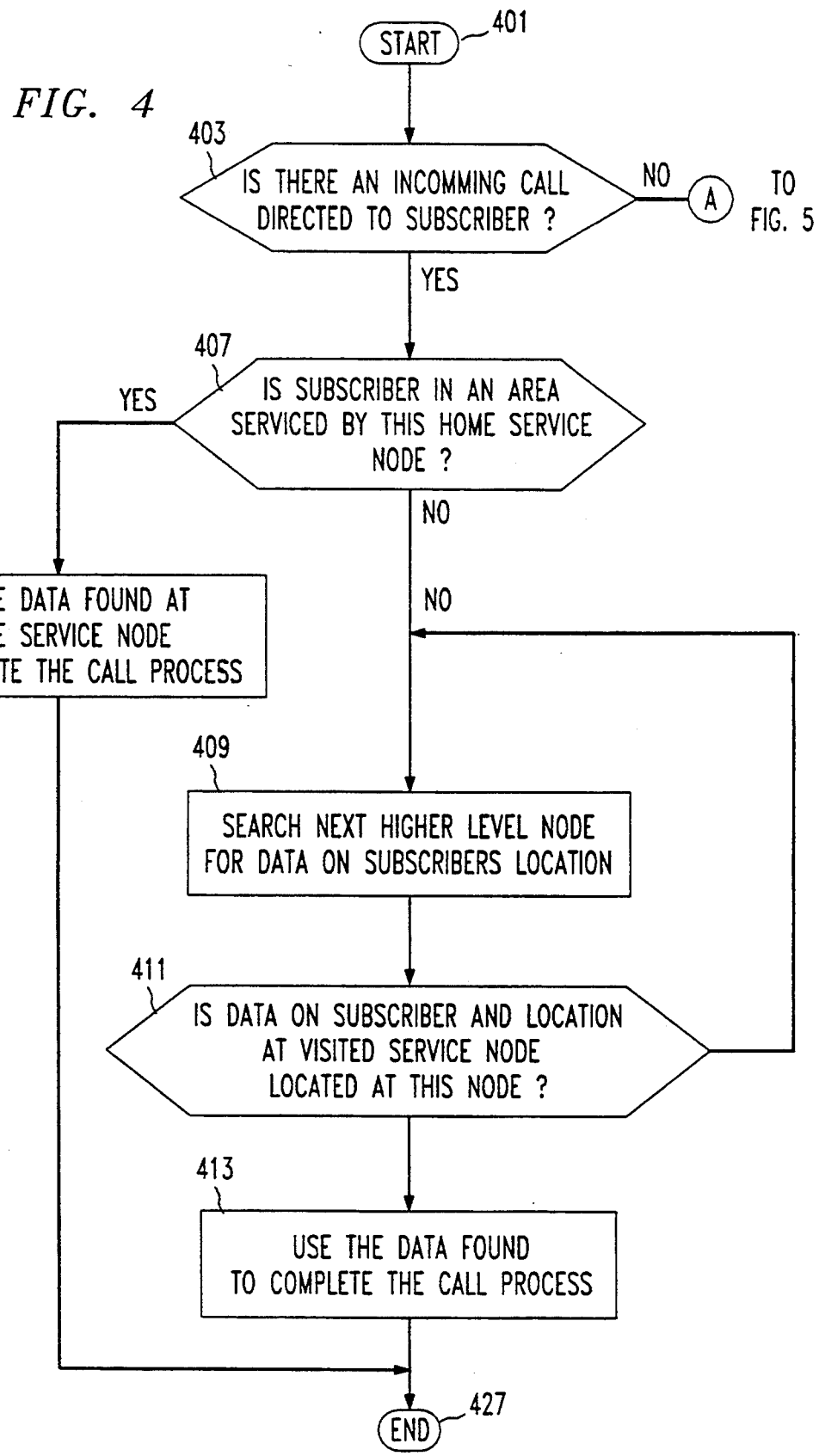
FIGS. 4 and 5 are a schematic of a process flow diagram indicating an illustrative search process according to the invention by which a visited service node of a subscriber is located.
Figure 5:
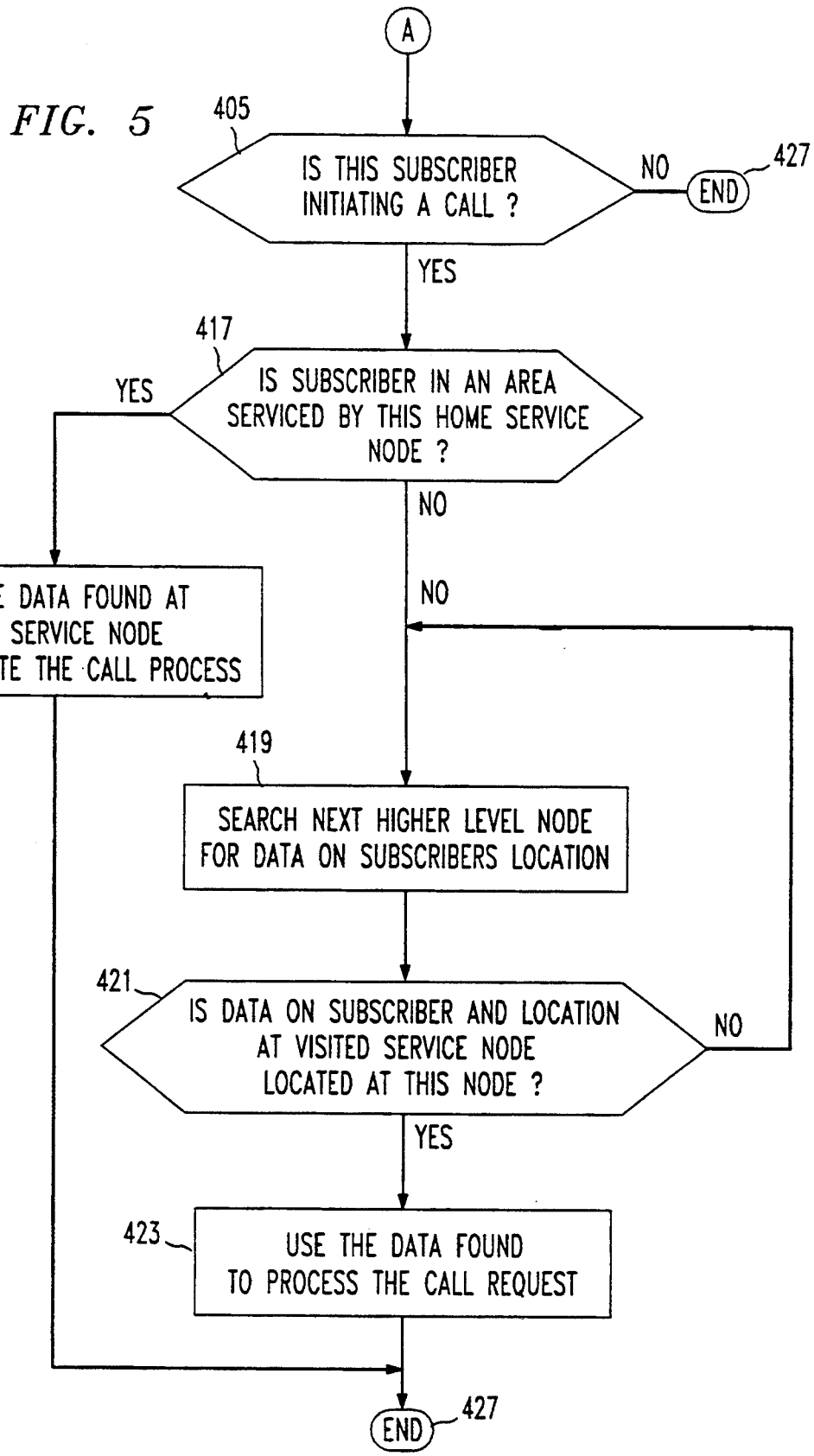

The flow process of locating subscriber information in response to an incoming call is shown in the overall flow process of FIGS. 4 and 5. The process is started at terminal 401 an instruction of an initial decision block 403 indicates a response to determine if there is an incoming call directed to the subscriber. If there is such an incoming call the decision block 407 initiates an inquiry to determine if the subscriber is located in an area serviced by the subscriber's home node. If the subscriber is being serviced by the home node, the flow process proceeds to block 415 and data at the home node is used to connect the incoming call to the subscriber.

If the subscriber is not presently in a location serviced by the home node, the directory system, as per block 409, searches the next higher level node in the directory/network tree for data as to the subscribers location. If data locating the subscriber is found the decision process instruction of the block 411 directs the flow process to the block 413 whereby the process instructions at block 413 use the data to enable completion of the call connection.

If no data location for the subscriber is found, the decision process of the block 411 returns the process flow to the instructions of the block 409 and the next higher level in the directory tree structure is searched for data on the subscribers location. The flow process, in this feedback path, continues to higher and higher levels in the directory tree until data locating the subscriber is found or until the root node is reached without finding the desired data.

If the decision implemented, as per block 403, shows no incoming call the flow proceeds to block 405 and implements instructions to determine if the subscriber is initiating a call. If the subscriber is initiating a call and is in the home node, as determined by the instructions of decision block 417, the instructions of block 425 use the data of the home node to process the call connection.

If the subscriber is away from the home node, the instructions of block 419 search the next higher level node of the tree to find the subscriber's location. If the desired location is found, as per decision block 421, the flow proceeds to block 423 and the location data is utilized to process the call connection. The processes terminates at the end terminal 427.

The instructions of the call routing and location process and the data storage handling are distributed among the individual nodes of the directory structure. Each node maintains a local directory and processing and data storage capability. A subscriber's information, pertaining to a home or visited node location is generally recorded in the home node, a visited node and a node rooting a subtree of a home and visited node. In some instances where the subscriber is inactive the data specifying a visited node may be incorrect. The data search processes include procedures to deal with this instance.

The data contained in each node also includes a routing table which identifies the nodes in the subtree rooted in that node. This data also specifies the connecting link which is used to convey information to that node.

Updating of information concerning the location of the subscriber occurs whenever the subscriber is registered at a data base of a node. The process of updating the directory as to the new location of the subscriber involves recording the new visited node location in the appropriate nodes and the deletion of information relating to an old visited node stored in various nodes. The messages used for this process by each node are the Location Update Request: (LUR); the Obsolete Location Indication: (OLI); the Obsolete Location Response: (OLR); and the Location Update Confirmation: (LUC). These particular message terms are defined in the definitions provided below at the end of the specification. Each node responds to these messages as detailed in the flow diagrams of FIGS. 6–11 to update its subscriber information. The process of information retrieval from the node data bases is disclosed in the flow diagrams of FIGS. 12–14.

Figure 3:
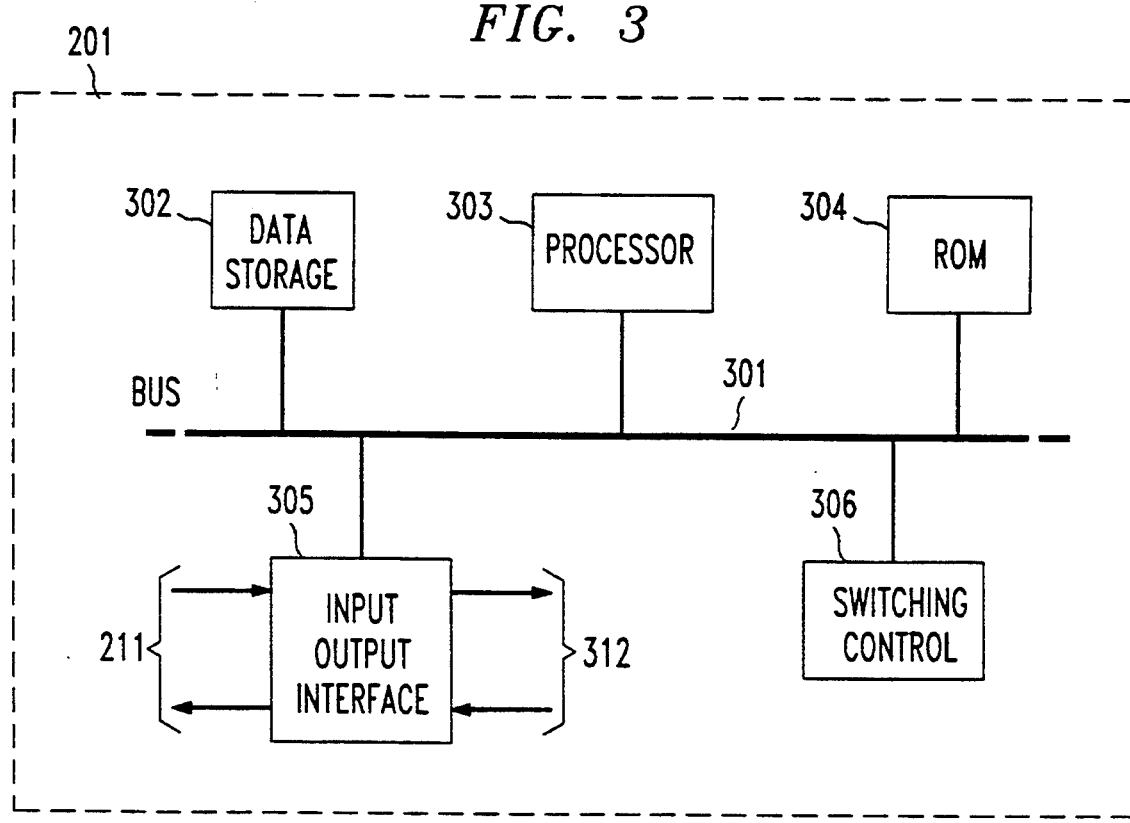
FIG. 3 is a block diagram of data handling and arrangement included in a node.

Each node includes memory as shown in FIG. 3 which includes information on various subscribers and instructions for responding to information request. Each node responds individually to the location updating messages as information on various subscribers changes. The response of the data processing procedures of each node to a LUR is disclosed in the flow diagrams of FIGS. 6–8.

Figure 6:
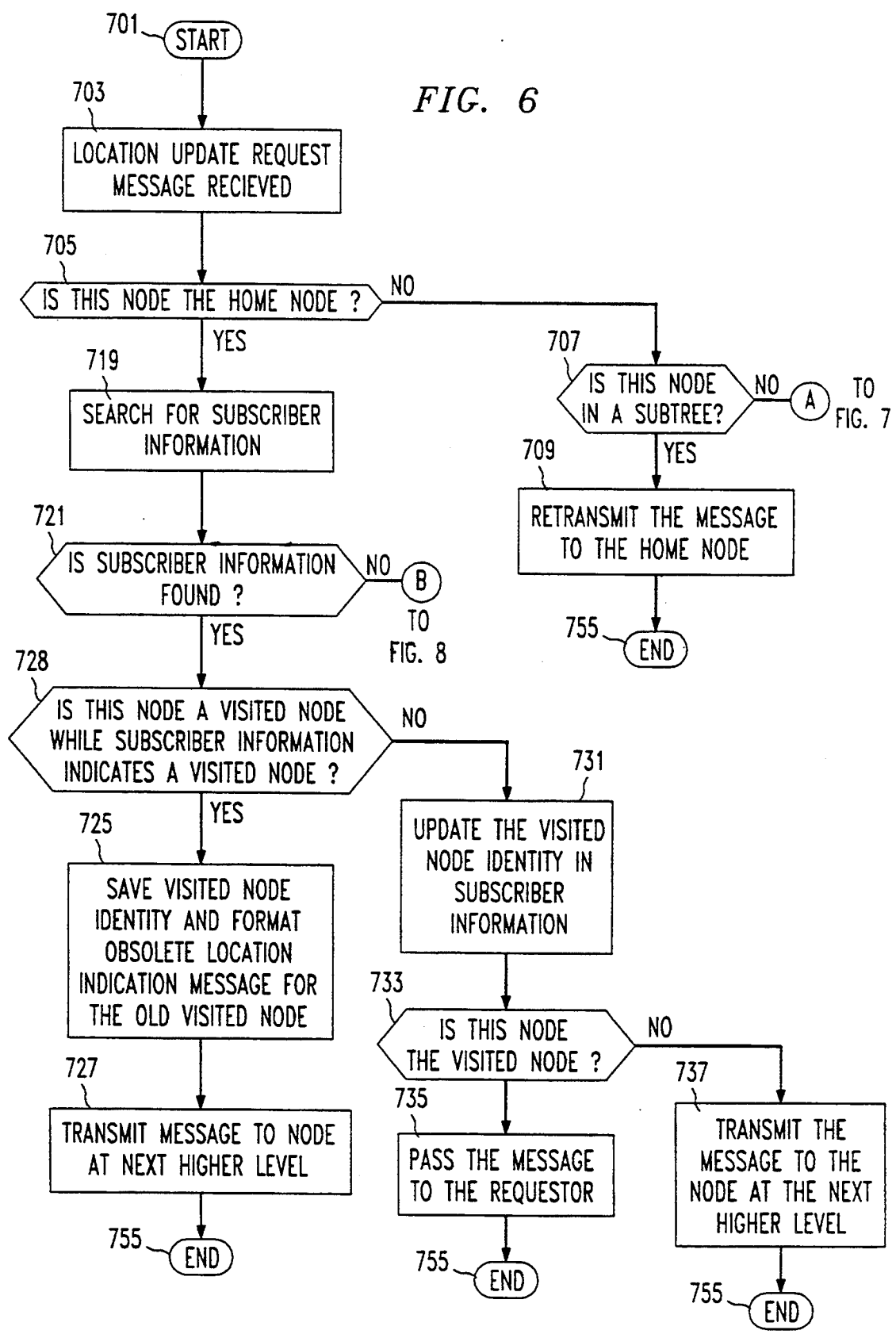
FIGS. 6–14 disclose schematics of flow processing diagrams of location data storage, message handling and call processing functions performed by each of the individual nodes of the directory/network structure.

The flow process of processing location update request messages (LUR) begins at the start terminal 701 in FIG. 6. This message is sent from a visited node, a newly visited by a subscriber to his home node. The location of the subscriber is updated by being registered at a node common to the newly visited node and the subscriber home node. The process of updating a node data base is begun with the receipt of a LUR message as noted in the block 703. A determination by the decision block 705 ascertains if this node is the home node. If this node is not the home node the flow proceeds to decision block 707 and the subsequent process is discussed below. If the node is the home node the instructions of block 719 search for the subscriber information. Decision block 721 ascertains if the desired subscriber information is found. If it is not the flow proceeds to block 739 in FIG. 8 as described below. If the desired information is found the flow proceeds to the decision block 728. Decision block 728 evaluates if the node is not a visited node and if the subscriber information indicates a visited node. If the answer is no the flow proceeds to block 731, as described below. If the answer is yes the flow proceeds to the block 725 whose instructions cause the visited node identity to be saved and an obsolete location indication message (OLI) is formatted for the old visited node. This message is transmitted to a node at the next higher level by block 727 and the flow ends at terminal 755.

If the response of decision block 728 is negative, the flow proceeds to the block 731 whose instructions update the visited node identity in the subscriber information database. Decision block 733 now determines if this node is the visited node. If it is the information message is forwarded to the originating requestor, as per the instruction of block 735. If it is not the message is transmitted to the node at the next higher level, as per block 737 and this marks the end of the flow process. An end terminal 755 follows the blocks 735 and 737.

Figure 8:
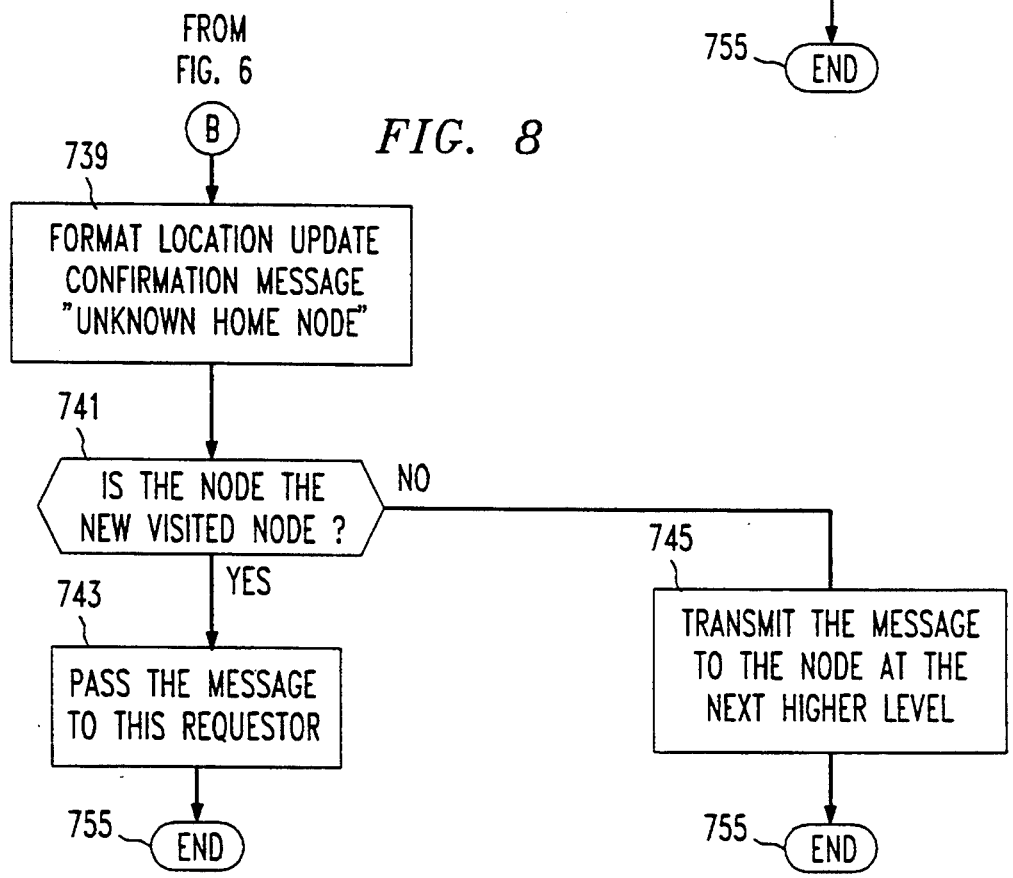

The flow proceeds from decision block 721 to the block 739, in FIG. 8, in response to a negative response to the inquiry on finding the subscriber information. The instructions of block 739 format a LUC message "unknown home node". The decision block 741 queries if this node is the new visited node. If it is the message is passed on to the requestor, as per block 743, and the process terminates at end terminal 755. If the node is not the new visited node the message is transmitted to the node at the next higher level, as per block 745, and the process terminates at end terminal 755.

Returning to the decision block 705, a determination that this node is not the home node causes the flow process to proceed to the decision block 707. Decision block 707 inquires if the node is in a subtree present node. If not the flow proceeds to the block 711 in FIG. 7 as discussed below. If the node is in the subtree the flow proceeds to block 709 whose instructions retransmit the message to the home node. The flow is terminated at end terminal 755.

Figure 7:
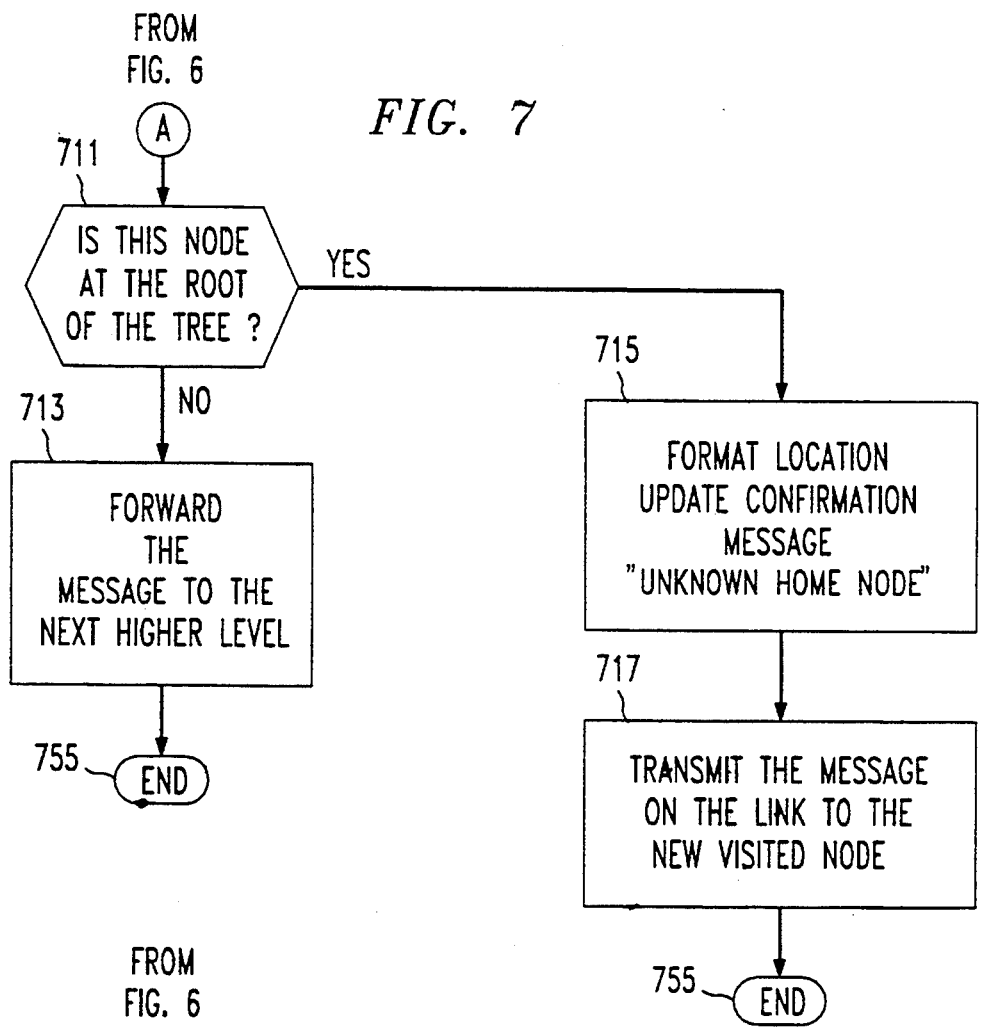

The flow in response to a negative response to the decision block 707 proceeds to the decision block 711 in FIG. 7, which inquires if this node is at the root of the tree. If not the flow proceeds to block 713 and the instructions therein cause the message to be forwarded to the next higher level. If this node is the root node, the flow proceeds to the block 715 and a LUC message "unknown home node" is formatted. This message is transmitted on the link to the new visited node as per instructions of block 717. The flow terminates in end terminal 755.

Figure 9:
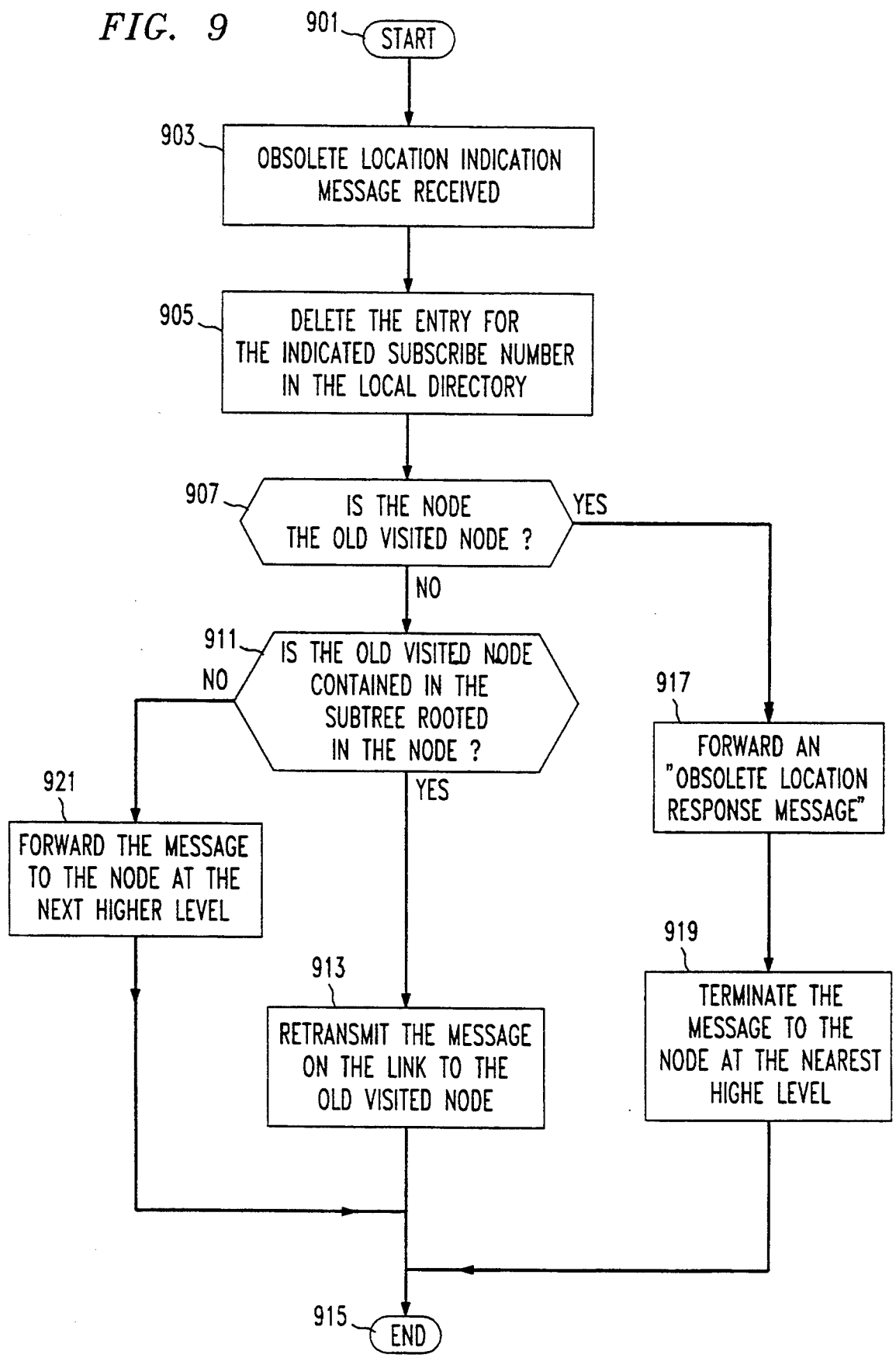

Obsolete Location Indication messages (OLI) are processed, beginning with start terminal 901, according to the flow process of FIG. 9. Receipt of an OLI is detected by the block 903. The instructions of the block 905 delete the entry for the subscriber in the local directory. The decision block 907 inquires if the node is the old visited node. If it is the flow proceeds to the block 917 whose instructions cause an OLR message to be formatted. This message is transmitted to the node at the next higher level of the tree, as per the instructions of block 919. The flow is terminated at end terminal 915.

If the response of decision block 907 is negative, the subsequent decision block 911 inquires if the old visited node is contained in a subtree rooted in this node. If it is the OLI message is retransmitted on the link to the old visited node as per instructions of block 913. If it is not contained in a subtree rooted in this node, the instructions of block 921 forward this message to the node at the next higher level of the tree.

Figure 10:
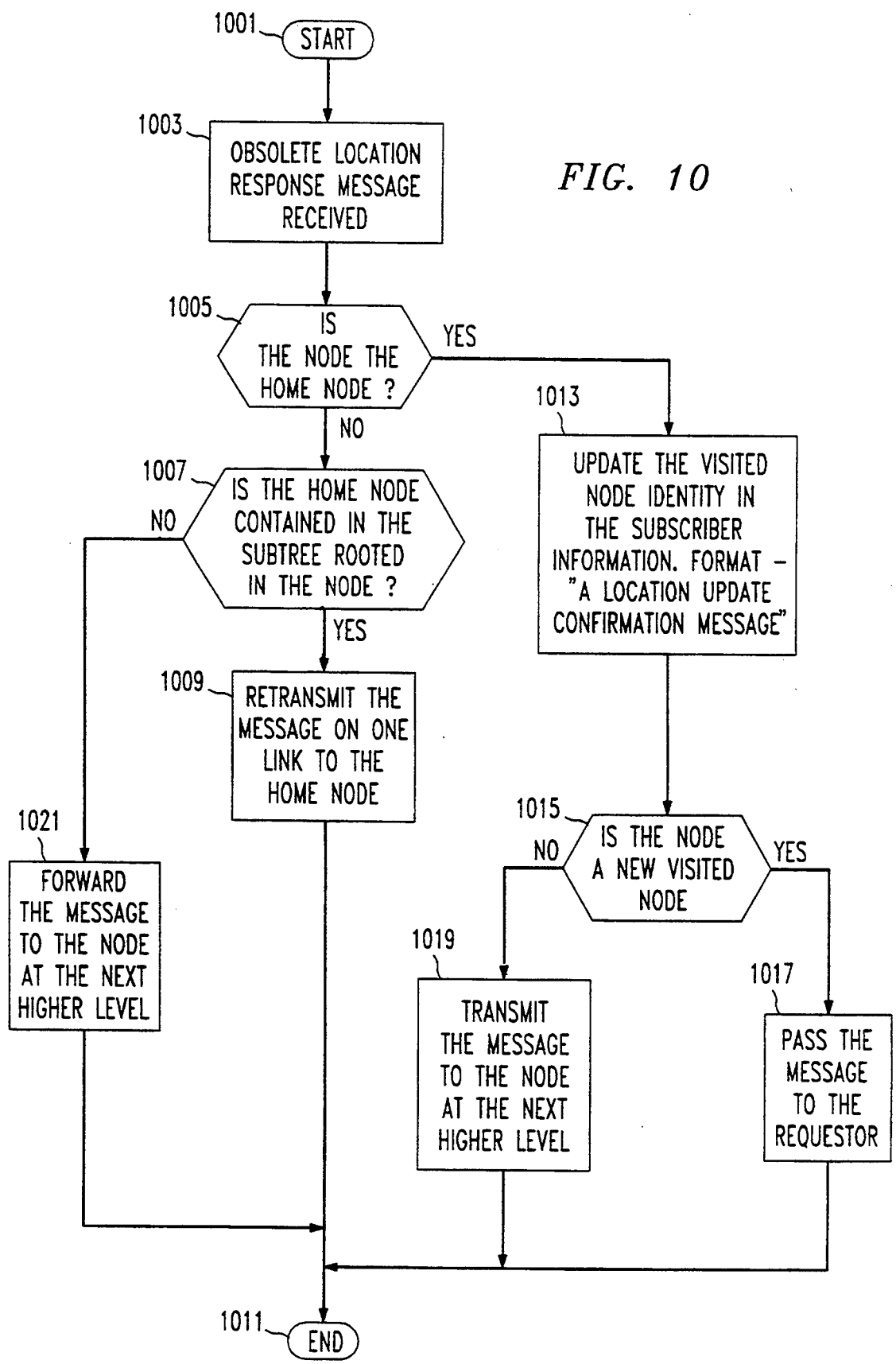

Processing of an Obsolete Location Response message OLR is shown in the flow process of FIG. 10 beginning at start terminal 1001. The block 1003 responds to receipt of a OLR and the decision block 1005 inquires if this node is the home node of the subscriber. If it is not the flow proceeds to decision block 1007 which inquires if the home node is in a subtree rooted in this node. If it is the instructions of block 1009 retransmit the message on the link to the home node and the process ends at terminal 1011. If the home node is not in the subtree, the OLI message is forwarded, by the instructions of block 1021 to the node at the next higher level.

An affirmative response of the decision block 1005 directs the flow process to the block 1013, whose instructions update the visited node identity in the subscriber information and format a Location Update Confirmation message LUC. Subsequent decision block 1015 inquires if this node is a new visited node. If it is the LUC is transmitted to the requestor ass per block 1017. If it is not the message is transmitted to the node at the next higher level. The flow process ends at terminal 1011.

Figure 11:
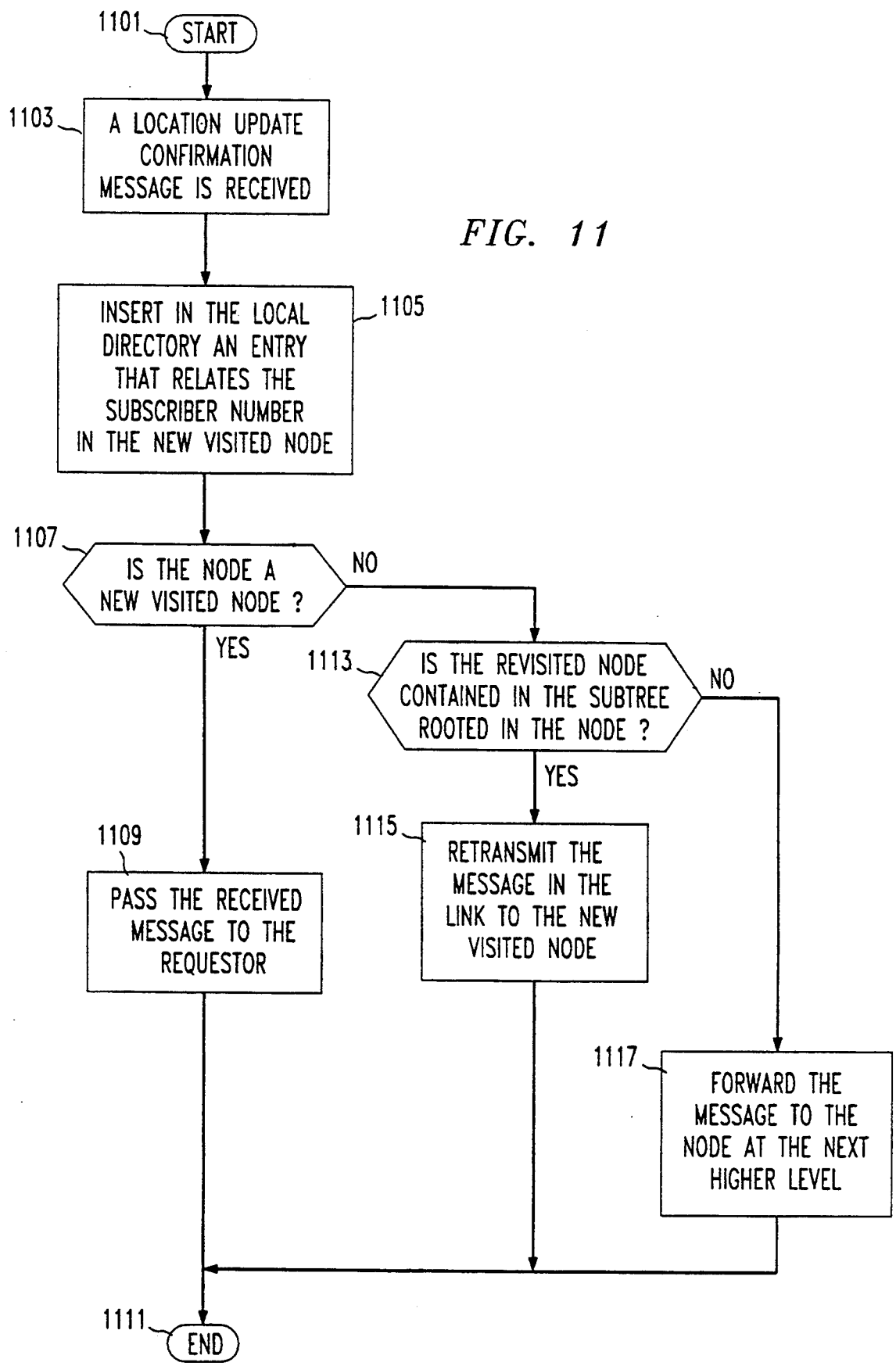

Processing of a Location Update Confirmation message LUC is shown by the flow process of FIG. 11 beginning with start terminal 1101 receipt of the LUC is acknowledged by block 1103 and the subsequent block 1105 places in the local directory of the node an entry that relates the subscriber number and the new visited node. The subsequent decision block 1107 inquires if the node is a new visited node. If it is the instructions of block 1109 pass the message to the requestor and the process ends at terminal 1111. If the node is not a new visited node, the flow proceeds to the decision block 1113 which inquires if the node is contained in a subtree of this node. If it is the LUC message is retransmitted, as per block 1115 on the link to a new visited node. If it is not the message is forwarded by block 1117 to the node at the next higher level of the tree. The flow process ends at terminal 1111.

Figure 12:
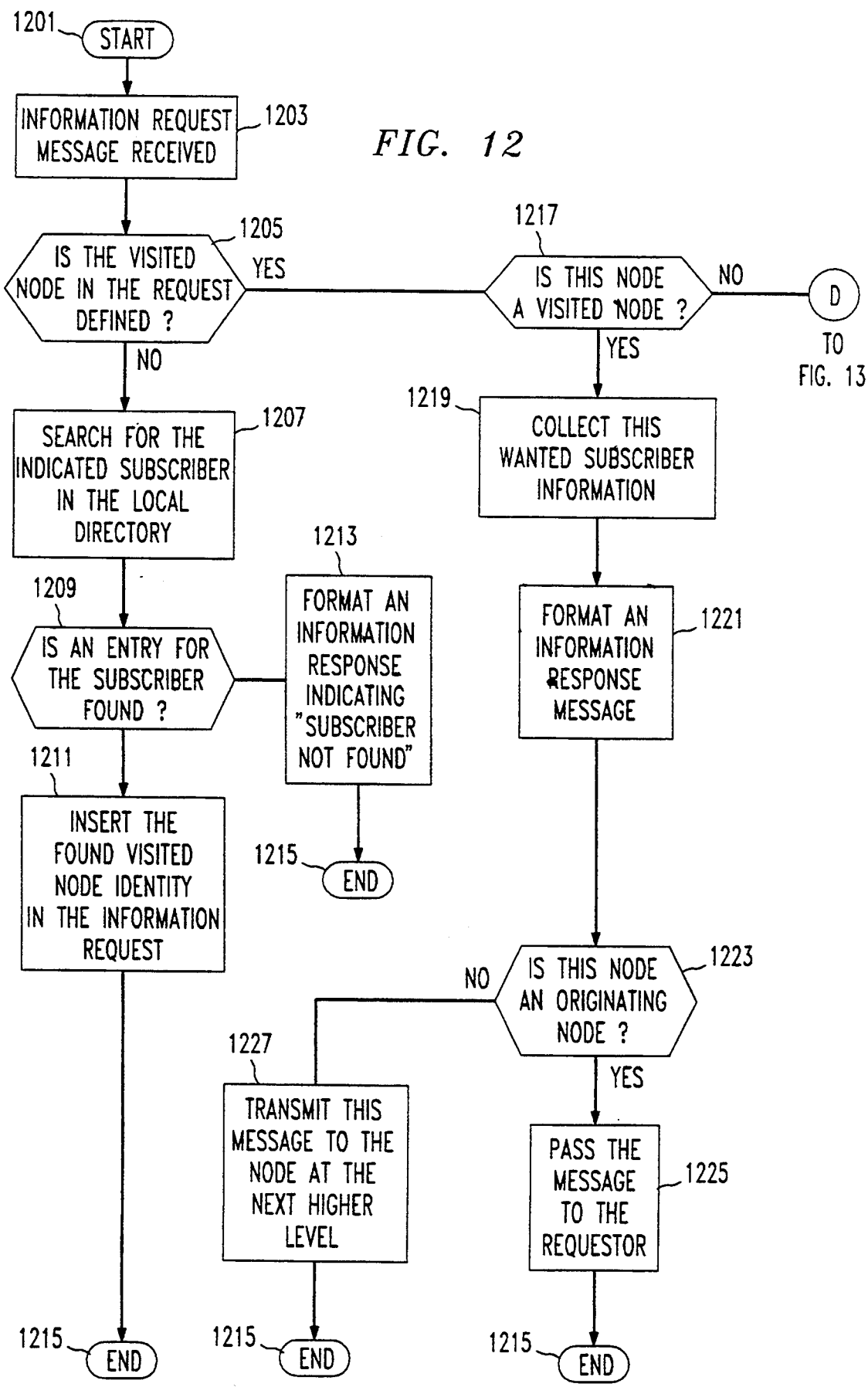
Figure 13:
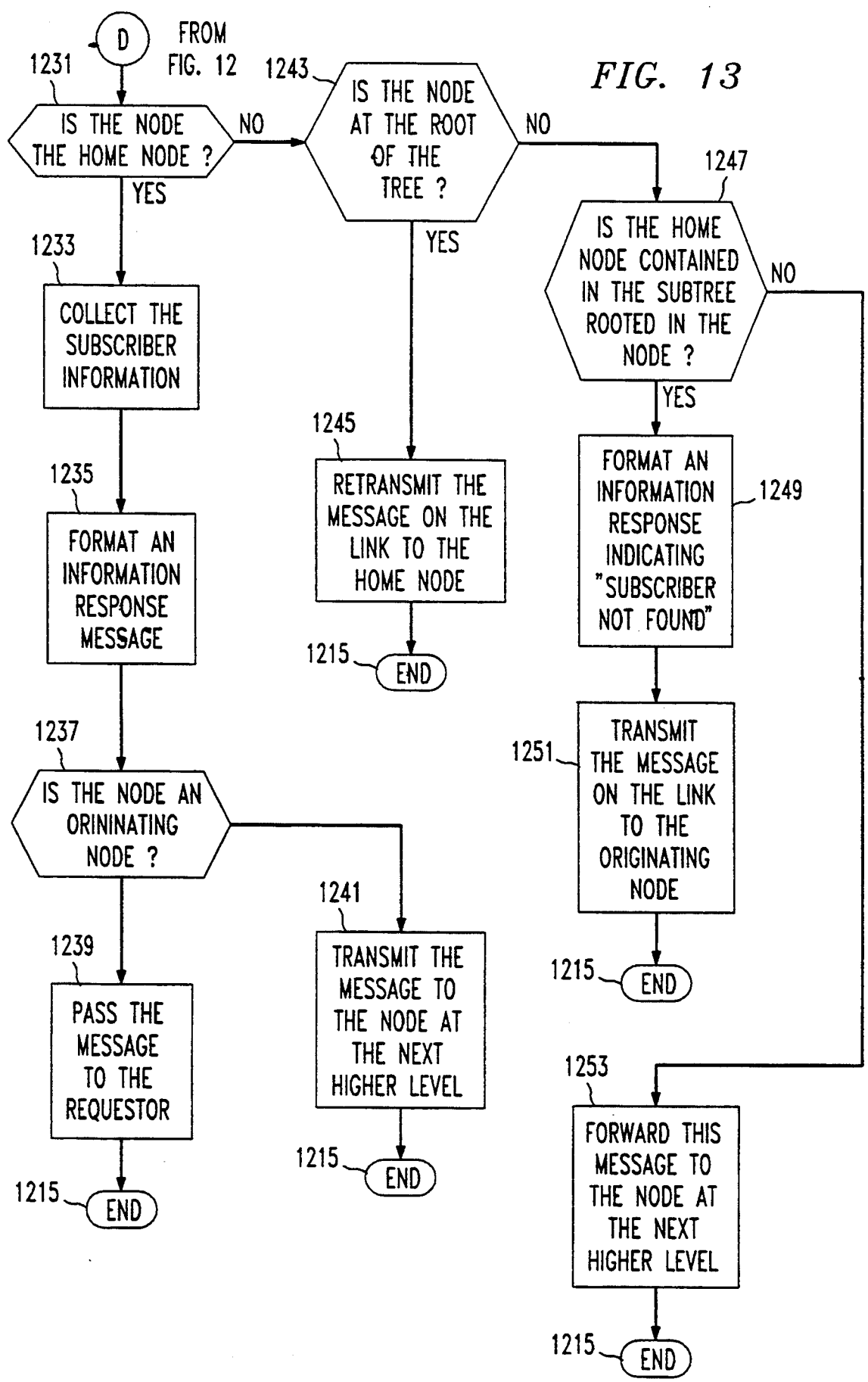
Figure 14:
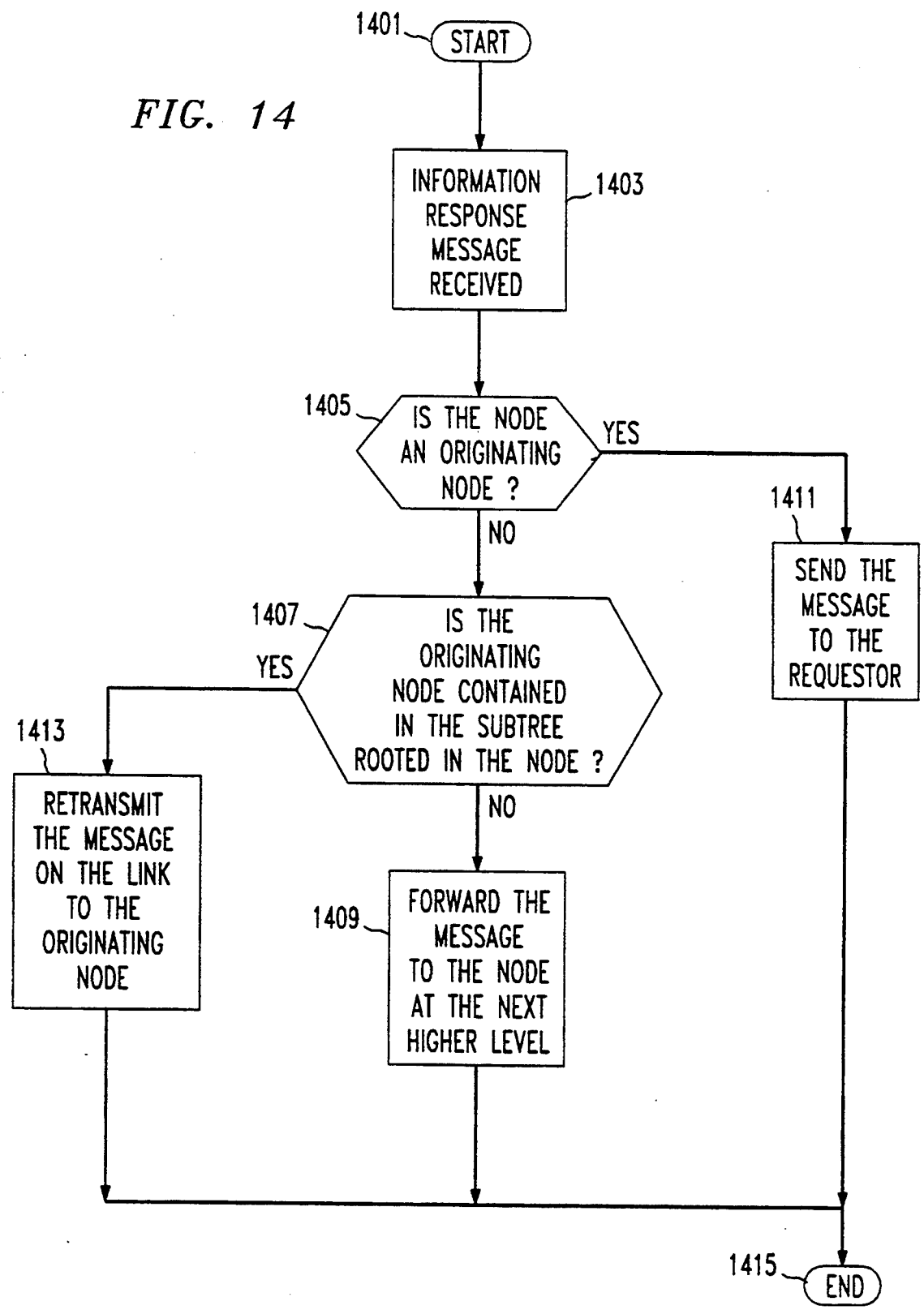

The process of information retrieval from the directory network is described in the flow processes of FIGS. 12, 13 and 14. Information retrieval is in response to an information request which is generated when an incoming call is to be routed to a particular subscriber. Before the call can be routed the subscriber location must be known. The requestor sends an information request to his associated node data base. This is the requestors home data base and the originating node. The information retrieval messages generated are the Information Request (IRq) and the Information Response (IRs) messages.

A node that receives an Information Request message IRq begins a flow process starting in the terminal 1201 of FIG. 12. The block 1203 responds to the receipt of a IRq and the decision block 1205 inquires if the visited node is defined in the request. With a positive response the flow proceeds to decision block 1217 and the following flow is described below. If it is not defined the flow proceeds to block 1207 which searches for the indicated subscriber in the local directory. Decision block 1209 determines if an entry is found. If it is the instructions of block 1211 insert the found visited node identity in the IRq and the process ends at terminal 1215. If the entry is not found instructions of block 1213 format an Information Response Message (IRs) "subscriber not found" and the process terminates at terminal 1215.

If the decision block 1205 gives an affirmative response, the flow proceeds to the decision block 1217 which inquires if the node is a visited node. If it is not the flow proceeds to decision block 1231, of FIG. 13, as described below. With an affirmative response the block 1219 causes the wanted subscriber information to be collected, and an IRs message is formatted as per block 1221. Subsequent decision block 1223 inquires if the node is an originating node. If it is block 1225 causes the message to be passed to the requestor and the process ends in terminal 1215. If it is not block 1227 causes the message to be passed to the node at the next higher level and the flow ends at terminal 1215.

A negative response to the decision block 1217 directs the process flow to the decision block 1231, of FIG. 13. Decision block 1231 inquires if the node is the home node. If it is the instructions of block 1233 collect the subscriber information. An IRs is formatted as per block 1235. Subsequent decision block 1237 inquires is the node is an originating node. If it is the instructions of block 1239 pass the message to the requestor. If not the instructions of block 1241 transmit the message to the node at the next higher level in the tree. The flow process ends at terminal 1215.

If decision block 1231 determines that the node is not the home node, the flow proceeds to decision block 1243. Decision block 1243 determines if the home node is contained in a subtree of this node. If it is the instruction of block 1245 retransmit the message on the link to the home node and the process ends at terminal 1215. If it is not the subsequent decision block 1247 inquires if the node is at the root of the tree. If it is block 1249's instructions format an IRs indicating "subscriber not found". This message is transmitted as per block 1251 on the link to the originating node and the process terminates at terminal 1215. If the node is not at the root of the tree, the instructions of block 1253 forward the message to the node at the next higher level in the tree. The process ends at terminal 1215.

The processing of the Information Response messages IRs is shown in the flow diagram of FIG. 14 starting at terminal 1401. Block 1403 responds to the receipt of an IRs and subsequent decision block 1405 inquires if the node is an originating node. If it is the message is sent to the requestor as per block 1411 and the process ends at terminal 1415. If it is not an originating node, decision block 1407 inquires if the originating node is contained in a subtree rooted in the node. If it is the message is retransmitted on the link to the originating node and the process ends at terminal 1415. If the originating node is not in the subtree the message is forwarded to the node at the next higher level of the tree and the process ends at terminal 1415.

Definitions of network technical terms;

Home Node:

A data base node that acts as the administrative base of a subscriber. The information stored for a subscriber normally includes a service profile and the visited node identity. The home node identity is derived from a subscriber number.

Visited Node:

A data base node at which subscriber information is stored during the time that the subscriber uses this node for network access. The node stores a service profile and subscriber status. It is not related to a subscriber number.

Originating Node:

A data base node from which as information request originates.

Location Update Request: (LUR)

An information request for identifying a subscriber registered in the data base.

Obsolete Location Indication: (OLI)

This information specifically identifies a subscriber in relation to an old visited node utilized. It is transmitted from the home node to an old visited node.

Obsolete Location Response: (OLR)

This information indicates a subscriber and a home node. It is sent from the old visited node to the home node.

Location Update Confirmation: (LUC)

This information identifies a subscriber and a new visited node. It is transmitted from the home node to the visited node.

Information Request (IRq)

An information retrieval message containing a subscriber number. It identifies the originating node the home node and the visited node. This message is conveyed from the originating node to the visited node if determined or otherwise to the home node.

Information Response (IRs)

An information retrieval message containing a subscriber number and the desired subscriber information or an indication that the subscriber is not found. It is transmitted from the visited node or home node to the originating node.

I claim:

1. A directory/network structure for call routing and storing data pertaining to mobile radiotelephone subscribers;

comprising;

a plurality of data handling nodes connected in a bifurcating tree type geometric configuration, including a root node, a plurality of service nodes including a home node and a plurality of visited service nodes and a plurality of levels of intermediary nodes between the root node and the service nodes, each of the root, service and intermediary nodes including data storage and processing circuitry for handling subscriber information and routing calls, including routines for subscriber information inquiries and subscriber inquiry call routing, including;

said subscriber information being only stored at nodes in a shortest path between a visited node and the home node;

means for addressing subscriber information requests to a node in the tree common to a subscriber's home node and a visited node location if the subscriber is roaming;

each node including processing means for directing information requests in a search pattern allowing a node at a minimum level of the tree height above a level of the service nodes with subscriber information to process the subscriber information request; and each node further including switching routing means for routing call requests through a node at a minimum level of the tree above a level of the service nodes at which the call request is entered.

2. A directory/network structure for call routing and storing data pertaining to mobile radiotelephone subscribers, as claimed in claim 1;

comprising;

means included in a request receiving node for responding to requests for updating subscriber information; including means for classifying the receiving node as either a home node, a visited node or an intermediary node serving as a root to a subtree of the directory/network structure to the subscriber.

means for responding to the means for classifying by answering the request and if as a home node directing the inquiry along branches of the tree likely to include a visited node including subscriber information.

3. A directory/network structure for call routing and storing data pertaining to mobile radiotelephone subscribers, as claimed in claim 1;

comprising;

each node including means for processing location update request messages for enabling processes that identify a subscriber and the related visited and home node.

4. A directory/network structure for call routing and storing data pertaining to mobile radiotelephone subscribers, as claimed in claim 1;

comprising;

each node including means for processing Obsolete Location indication messages that denote a subscriber and an old visited node.

5. A directory/network structure for call routing and storing data pertaining to mobile radiotelephone subscribers, as claimed in claim 1;

comprising;

each node including means for processing Obsolete Location Response messages that indicate a subscriber and an old visited node.

6. A directory/network structure for call routing and storing data pertaining to mobile radiotelephone subscribers, as claimed in claim 1;

comprising;

each node including means for processing information requests in response to requests for call routing from an originating node to a home node or visited node via the shortest path through a common root node.

7. A method of call routing and storing data pertaining to mobile radiotelephone subscribers:

comprising the steps of:

providing a plurality of data handling nodes each including data storage and data processing circuitry;

connecting the nodes into a bifurcating tree structure geometric configuration including a root node, plurality of service nodes and a plurality of intermediate nodes coupling the service nodes and the root node;

addressing subscriber information requests to a particular node sequentially from a preceding node in response to initiation of a request from a home node of the subscriber;

said subscriber information being only stored at nodes in a shortest path between a visited node and the home node;

independently processing the request in each node in sequence from a preceding node;

continuing information processing until a node at a minimum level of the tree has sufficient information to fulfill the subscriber information request.

8. A method of call routing and storing data pertaining to mobile radiotelephone subscribers, as claimed in claim 7;

comprising the steps of:

classifying the node handling an information request as a home, visited, newly visited or originating node for controlling processing of the request.

9. A method of call routing and storing data pertaining to mobile radiotelephone subscribers, as claimed in claim 7;
comprising the steps of:
directing subscriber information request in response to a classification of the preceding node supplying input to the present particular node.

* * * * *